(12) United States Patent
Huang et al.

(10) Patent No.: US 10,717,055 B2
(45) Date of Patent: Jul. 21, 2020

(54) FLOATING CHEMICAL DISPENSER

(71) Applicant: BESTWAY INFLATABLES & MATERIAL CORP., Shanghai (CN)

(72) Inventors: Shuiyong Huang, Shanghai (CN); Wenhua Hu, Shanghai (CN); Jinlin Chen, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 340 days.

(21) Appl. No.: 15/792,561

(22) Filed: Oct. 24, 2017

(65) Prior Publication Data

US 2019/0022603 A1    Jan. 24, 2019

(30) Foreign Application Priority Data

Jul. 20, 2017   (CN) ..................... 2017 2 0887645 U

(51) Int. Cl.
| | | |
|---|---|---|
| *B01D 11/02* | (2006.01) | |
| *A61L 2/00* | (2006.01) | |
| *C02F 1/76* | (2006.01) | |
| *B01F 1/00* | (2006.01) | |
| *B01F 13/00* | (2006.01) | |
| *C02F 1/68* | (2006.01) | |
| *E04H 4/12* | (2006.01) | |
| *B01J 4/00* | (2006.01) | |
| *C02F 103/42* | (2006.01) | |

(52) U.S. Cl.
CPC ........ *B01F 1/0027* (2013.01); *B01F 13/0049* (2013.01); *B01J 4/001* (2013.01); *C02F 1/688* (2013.01); *E04H 4/1281* (2013.01); *C02F 2103/42* (2013.01)

(58) Field of Classification Search
CPC .. A61L 2/0088; A61L 2/18; C02F 1/00; C02F 11/00; C02F 220/00; C02F 1/006; C02F 1/688; B05B 11/0013; B05B 11/0038; B05B 11/00412; E04H 4/1209; E04H 4/1281
USPC ....... 422/261, 275–278, 274, 282, 292, 297, 422/300, 902; 210/754, 167.11, 206, 97, 210/198.1, 205, 167.1, 450; 137/268, 845
See application file for complete search history.

(56) References Cited

U.S. PATENT DOCUMENTS

| | | |
|---|---|---|
| 3,792,979 A | 2/1974 | Clinton |
| 4,473,533 A | 9/1984 | Davey |
| (Continued) | | |

*Primary Examiner* — Monzer R Chorbaji
(74) *Attorney, Agent, or Firm* — AJ Moss; Dickinson Wright PLLC

(57) ABSTRACT

A floating chemical dispenser is provided, which includes: a body portion having a first chamber for receiving solid chemicals, a second chamber for receiving a floating member, and at least one first hole for communicating the first chamber with an external environment, an opening is disposed at one end of the body portion, and the opening is communicated with the first chamber; and a cover, configured to close the opening of the body portion; wherein the cover is detachably connected with the body portion via a first locking mechanism, and the first locking mechanism has a locking position and an unlocking position, and is configured to move between the locking position and the unlocking position via pressing and rotating the cover by a user, so as to control locking or unlocking of the cover and the body portion. Therefore, safety performance of the floating chemical dispenser can be improved.

10 Claims, 12 Drawing Sheets

(56) References Cited

U.S. PATENT DOCUMENTS

| | | | |
|---|---|---|---|
| 4,630,634 | A | 12/1986 | Sasaki et al. |
| 4,822,571 | A | 4/1989 | Nicholson et al. |
| 4,825,528 | A | 5/1989 | Nicholson et al. |
| 4,828,803 | A | 5/1989 | Nicholson et al. |
| 4,828,804 | A | 5/1989 | Nicholson et al. |
| 4,917,868 | A | 4/1990 | Alexander et al. |
| 5,055,183 | A | 10/1991 | Buchan |
| 5,407,567 | A | 4/1995 | Newhard |
| 5,476,116 | A | 12/1995 | Price et al. |
| 5,520,449 | A | 5/1996 | Klak |
| 6,123,842 | A | 9/2000 | Buchan |
| 6,432,371 | B1 | 8/2002 | Oliver, Jr. |
| 6,855,300 | B2 | 2/2005 | Cormier |
| 7,922,982 | B1 | 4/2011 | Brennan |
| 8,007,664 | B2 * | 8/2011 | Reed ............ B01F 1/0027 116/228 |
| 2004/0027036 | A1 | 2/2004 | Hall |
| 2014/0110352 | A1 | 4/2014 | King et al. |

\* cited by examiner

FLOATING CHEMICAL DISPENSER

CROSS-REFERENCE TO RELATED APPLICATIONS

This application claims the benefit of priority to Chinese Patent Application No. 201720887645.0, titled "FLOATING CHEMICAL DISPENSER", filed on Jul. 20, 2017, the entire disclosure of which are incorporated herein by reference.

TECHNICAL FIELD

The present disclosure relates to chemical dispenser field, and more particularly to a floating chemical dispenser applied to a swimming pool or a SPA pool and so on.

BACKGROUND

Water in a pool such as a swimming pool or a SPA pool may be contaminated by algae, bacteria, viruses or other microorganisms when the pool is used for a period of time, which may influence users' health. In order to control or kill contaminants such as algae, bacteria and viruses, corresponding water treatment chemicals are usually added to the water. Water treatment chemicals such as sodium hypochlorite, Bromo-Chloro-Dimethyl Hydantoin (BCDMH) and so on are commonly used, and need to be regularly added to the pool according to size of the pool and use frequency, so as to keep a good water quality of the pool in a long time.

Online chemical dispensers or floating chemical dispensers are usually applied to releasing chemicals, a method for disinfection and sterilization using the floating chemical dispensers includes putting sodium hypochlorite, BCDMH and other tablets into a chemical storage chamber of the floating chemical dispenser, and putting the floating chemical dispenser into the water, then the solid chemicals will be slowly dissolved into the water, so as to disinfect the water. Due to the sodium hypochlorite, BCDMH and other commonly used water treatment chemicals having strong oxidation, human body may be hurt once human skin or eyes are in direct contact with these chemicals.

Nowadays separation of chemicals and the external environment in the commonly used floating chemical dispensers on the market is achieved by closing an opening of a chemical storage chamber with a cover. However it is easily for children to open the cover by hand and directly contact the solid chemicals in the chemical storage chamber, which may result in accidents. On the other hand, when users put the solid chemicals into the chemical storage chamber, the users usually take the solid chemicals directly by hand, which may also hurt the users' skin.

Therefore, safety performance of the floating chemical dispensers in a conventional technology needs to be improved.

SUMMARY

A floating chemical dispenser is provided according to embodiments of the present disclosure, so as to improve safety performance of the floating chemical dispensers in a conventional technology.

The floating chemical dispenser includes: a body portion having a first chamber for receiving solid chemicals, a second chamber for receiving a floating member, and at least one first hole for communicating the first chamber with an external environment, an opening is disposed at one end of the body portion, and the opening is communicated with the first chamber; and a cover, configured to close the opening of the body portion; wherein the cover is detachably connected with the body portion via a first locking mechanism, and the first locking mechanism has a locking position and an unlocking position, and is configured to move between the locking position and the unlocking position via pressing and rotating the cover by a user, so as to control locking or unlocking of the cover and the body portion.

Optionally, the first locking mechanism may include: a first hook, an elastic structure and a first slot; wherein the first hook is disposed on the cover, the elastic structure and the first slot are disposed on a housing of the body portion near the opening, width of a first end of the first slot is greater than width of a second end of the first slot, the first hook is configured to be inserted into the first slot from the first end of the first slot, to slide to the second end of the first slot and to be hooked to an inner surface of the body portion, the elastic structure is configured to apply an upward force to the cover, the first locking mechanism is in the unlocking position when the first hook is positioned at the first end of the first slot, and the first locking mechanism is in the locking position when the first hook is positioned at the second end of the first slot.

Optionally, a stop part may be disposed on the body portion, and may be configured to stop the first hook at the second end of the first slot.

Optionally, the stop part may include a protrusion, where the protrusion is adjacent to the second end of the first slot, and when the first hook is positioned between the second end of the first slot and the stop part, the first locking mechanism is in the locking position.

Optionally, the first hook may be L-shaped, and may include a shank portion and a hook portion, where the hook portion is configured to pass through the first end of the first slot and to be hooked to the inner surface of the body portion, and the shank portion is configured to slide in the first slot.

Optionally, the elastic structure may include: a slot hole disposed on the housing of the body portion near the opening; and an elastic piece disposed in the slot hole, the elastic piece comprises a middle portion in an arcuate shape and two end portions located at both sides of the middle portion, where the two end portions are respectively connected with the housing of the body portion at both ends of the slot hole, at least a portion of the middle portion protrudes from surface of the housing of the body portion, and the middle portion is configured to be elastically abutted against the cover.

Optionally, the elastic structure and the housing of the body portion may be integrally molded.

Optionally, the cover may include a rigid frame portion and a flexible isolation glove connected with the rigid frame portion, where the isolation glove is configured to be used by a user to take the solid chemicals.

Optionally, the floating chemical dispenser may further include a control portion, where the control portion may be sleeved outside the other end of the body portion where the at least one first hole is located and may be configured to control amount of liquid flowing into or flowing out of the first chamber via the at least one first hole; and the control portion may be rotatably connected with the body portion via a second locking mechanism, and the second locking mechanism may include: a second slot, disposed at a bottom of the body portion, and a second hook, disposed on the control portion; wherein the second hook is configured to pass through the second slot, to slide in the second slot and to be hooked to an inner surface of the bottom of the body portion, when the control portion is connected with the body portion.

Optionally, a friction structure may be respectively disposed on the body portion and the control portion, and may be configured to increase friction between the control portion and the body portion when there is a relative rotation between the control portion and the body portion.

Optionally, the friction structure may include a tooth surface on the body portion and at least one rib on the control portion; and the tooth surface may include a plurality of longitudinal grooves, and the plurality of longitudinal grooves may be parallelly arranged.

Compared with a conventional technology, technical solution of the present disclosure has the following beneficial effects.

The cover of the floating chemical dispenser according to embodiments of the present disclosure is detachably connected with the body portion via the first locking mechanism, where the first locking mechanism has the locking position and the unlocking position, and is configured to move between the locking position and the unlocking position via pressing and rotating the cover by a user, so as to control locking or unlocking of the cover and the body portion. In the present disclosure, the risk that the cover is opened by children and the children contact the solid chemicals in the storage chamber by accident can be reduced through a double action (i.e. pressing and rotating) design in opening manner of the cover, thereby improving the safety performance of the floating chemical dispenser.

Further, a flexible isolation glove is disposed on the cover, so that the user can take the solid chemicals by means of the flexible isolation glove, thereby preventing the user's skin from being hurt when the user is in direct contact with the solid chemicals.

Further, the floating chemical dispenser further includes a control portion, which is sleeved outside the other end of the body portion where the at least one first hole is located and is rotatably connected with the body portion, and the user can control amount of liquid flowing into or flowing out of the first chamber via the at least one first hole by rotating the control portion, so as to control dissolution rate of the solid chemicals in the first chamber or rate of the chemical solution diffusing into the pool.

Further, the control portion and the body portion can be connected with each other through the second locking mechanism, thereby preventing the control portion from being separated from the body portion during operation.

Further, the friction structure can increase friction between the control portion and the body portion, thereby preventing the control portion from rotating under impact of water flow.

DETAILED DESCRIPTION

A floating chemical dispenser is provided according to embodiments of the present disclosure, which will be described in detail below with reference to the accompanying drawings.

Figure 1:
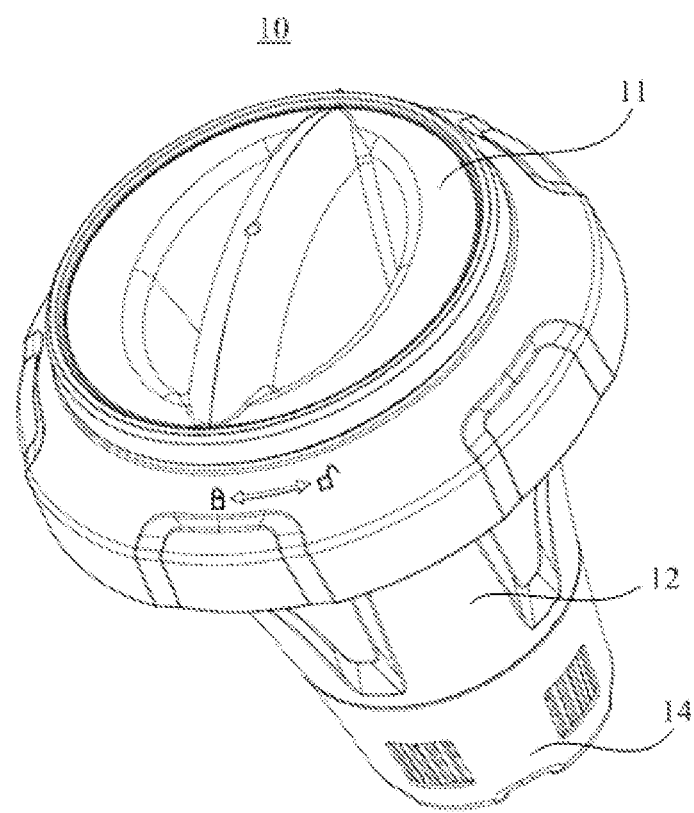
FIG. 1 schematically illustrates a stereogram of a floating chemical dispenser 10 according to some embodiments of the present disclosure.
Figure 2A:
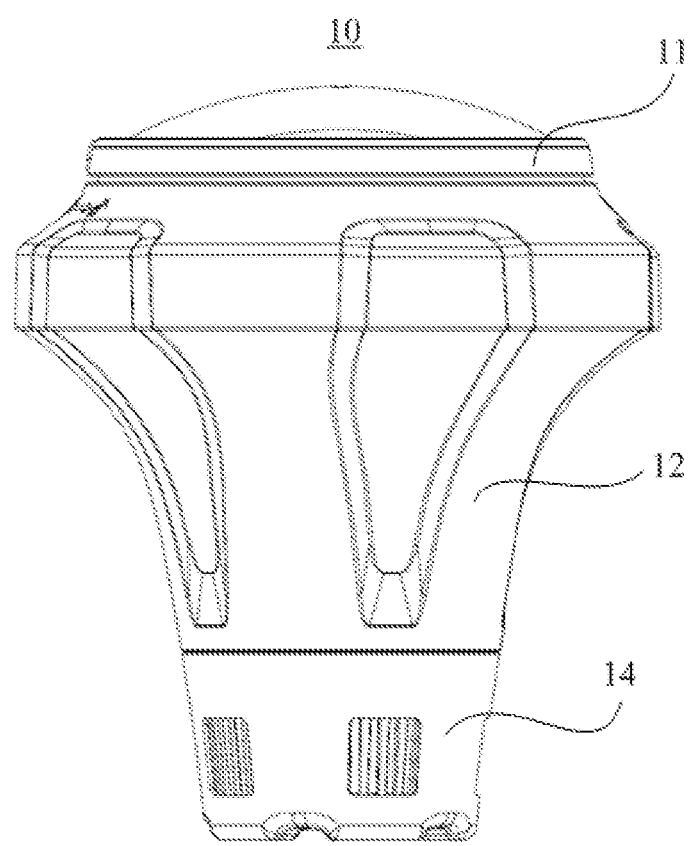
FIG. 2A schematically illustrates a front view of the floating chemical dispenser 10 according to the embodiments of the present disclosure shown in FIG. 1.
Figure 2B:
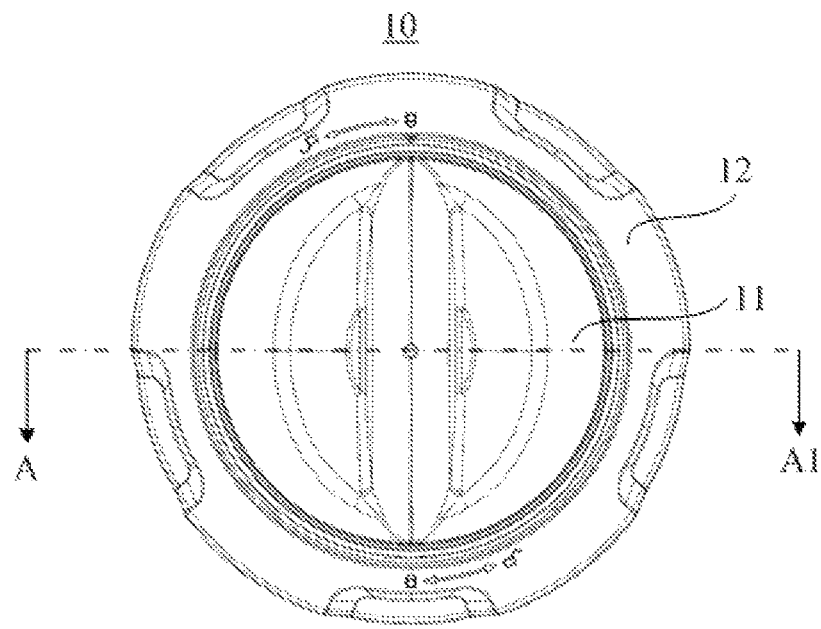
FIG. 2B schematically illustrates a top view of the floating chemical dispenser 10 according to the embodiments of the present disclosure shown in FIG. 1.
Figure 2C:
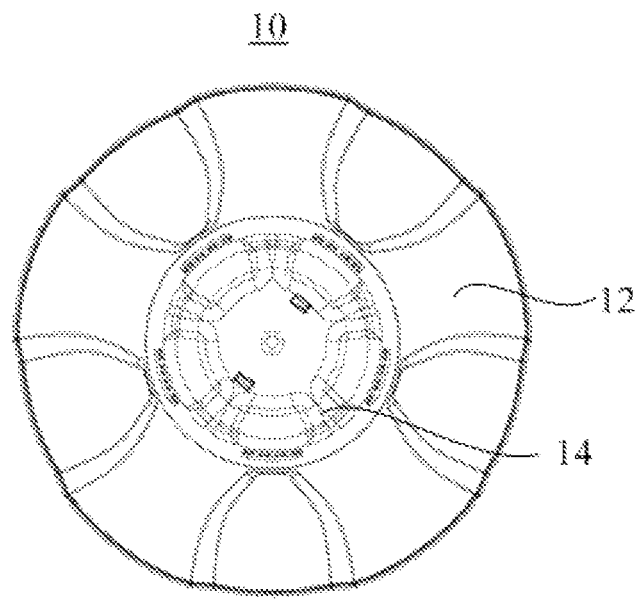
FIG. 2C schematically illustrates a bottom view of the floating chemical dispenser 10 according to the embodiments of the present disclosure shown in FIG. 1.
Figure 3A:
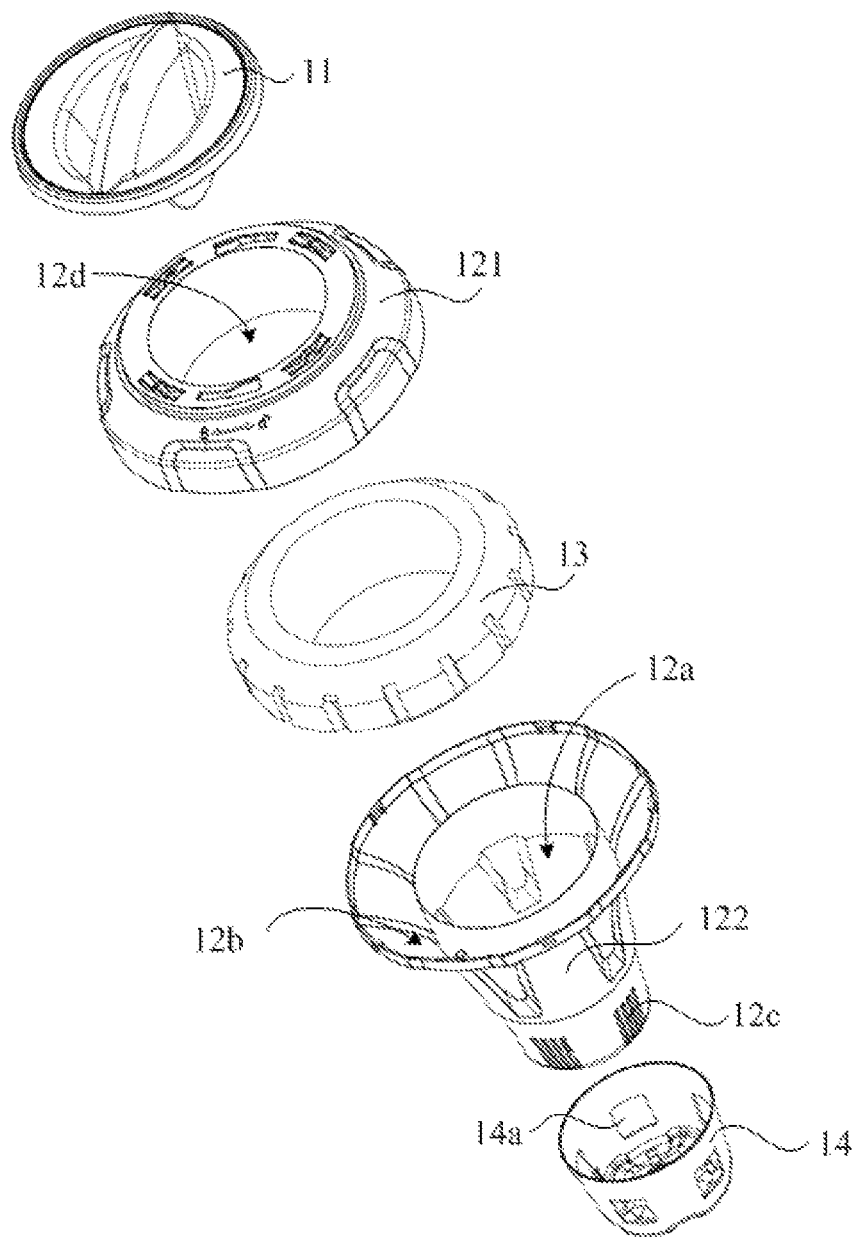
FIG. 3A schematically illustrates a first exploded view of the floating chemical dispenser 10 according to the embodiments of the present disclosure shown in FIG. 1.
Figure 3B:
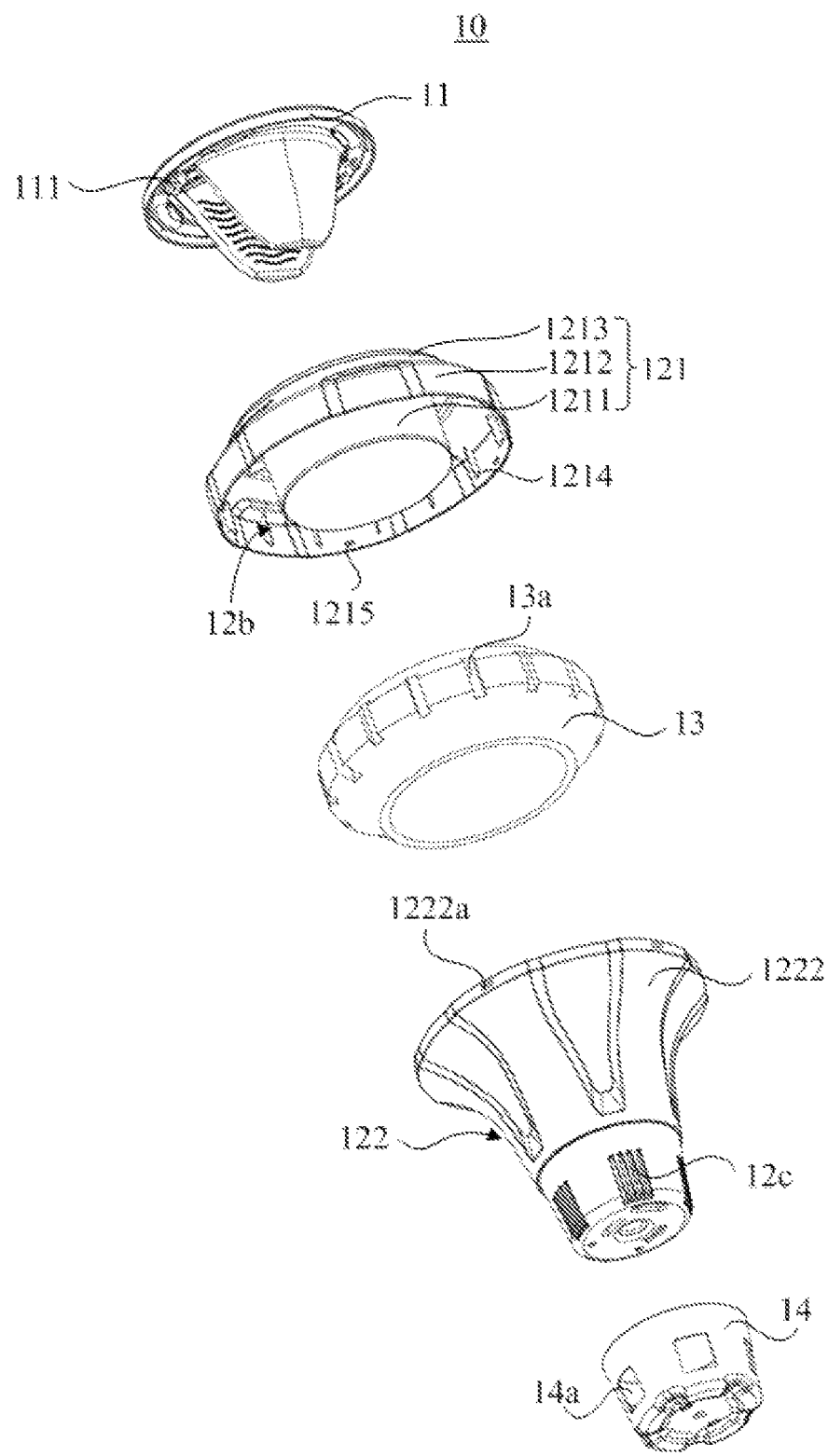
FIG. 3B schematically illustrates a second exploded view of the floating chemical dispenser 10 according to the embodiments of the present disclosure shown in FIG. 1.

Referring to FIG. 1 to FIG. 3B, FIG. 1 schematically illustrates a stereogram of a floating chemical dispenser 10 according to some embodiments of the present disclosure, FIGS. 2A, 2B and 2C respectively illustrate a front view, a top view and a bottom view of the floating chemical dispenser 10 according to the embodiments of the present disclosure shown in FIG. 1, FIG. 3A schematically illustrates a first exploded view of the floating chemical dispenser 10 according to the embodiments of the present disclosure shown in FIG. 1, and FIG. 3B schematically illustrates a second exploded view of the floating chemical dispenser 10 according to the embodiments of the present disclosure shown in FIG. 1.

In some embodiments, the floating chemical dispenser 10 may include a cover 11 and a body portion 12, where the body portion 12 has a first chamber 12a for receiving solid chemicals, a second chamber 12b for receiving a floating member 13, and at least one first hole 12c for communicating the first chamber 12a with an external environment. An opening 12d is disposed at one end of the body portion 12, where the opening 12d is communicated with the first chamber 12a, and the cover 11 is configured to close the opening 12d of the body portion 12 so as to close the first chamber 12a.

In some embodiments, the body portion 12 may include a first housing 121 and a second housing 122, where the first housing 121 has the first chamber 12a for receiving solid chemicals, and the first housing 121 and the second housing 122 are detachably connected and collectively define the second chamber 12b for receiving the floating member 13.

In some embodiments, the floating chemical dispenser 10 may further include a control portion 14, which is sleeved outside the other end of the body portion 12 where the at least one first hole 12c is located and is configured to control amount of liquid flowing into or flowing out of the first chamber 12a via the at least one first hole 12c.

Specifically, the control portion 14 is rotatably connected with the body portion 12, and at least one second hole 14a is disposed at positions on the control portion 14 that correspond to the at least one first hole 12c. For example, when it is necessary to sterilize the pool using the floating chemical dispenser 10, a user may rotate the control portion 14 to make the at least one second hole 14a overlapped with the at least one first hole 12c, so that the first chamber 12a can be communicated with the external environment. Then the user may put the floating chemical dispenser 10 in a pool, and water in the pool will flow into the first chamber 12a through an overlapped area of the at least one second hole 14a and the at least one second hole 12c, therefore the solid chemicals in the first chamber 12a can be dissolved and form a solution, and the solution will diffuse into surrounding water environment through the overlapped area of the at least one second hole 14a and the at least one first hole 12c, thereby sterilizing the water in the pool; when it is not necessary to use the floating chemical dispenser 10, the user may rotate the control portion 14 to make the at least one first hole 12c and the at least one second hole 14a non-overlapped, then the at least one first hole 12c is closed, and liquid in the pool cannot flow into the first chamber 12a. Further, by controlling an area of the at least one second hole 14a overlapped with the at least one first hole 12c, it is possible to control a speed at which the liquid flows into or flows out of the first chamber 12a, thereby controlling dissolution rate of the solid chemicals or rate of the solution diffusing into the pool.

In other embodiments, the floating chemical dispenser may not include the control portion, and can still be used to sterilize the pool, but amount of liquid flowing into or flowing out of the first chamber in unit time is constant and cannot be controlled artificially.

As described in the background art, the cover of the floating chemical dispenser in the conventional technology is easy to be opened which may cause accidents. In order to solve this technical problem, the cover 11 of the floating chemical dispenser 10 according to embodiments of the present disclosure is detachably connected with the first housing 121 of the body portion 12 via a first locking mechanism, where the first locking mechanism has a locking position and an unlocking position, and is configured to move between the locking position and the unlocking position via pressing and rotating the cover 11 by a user, so as to control locking or unlocking between the cover 11 and the body portion 12.

Figure 4:
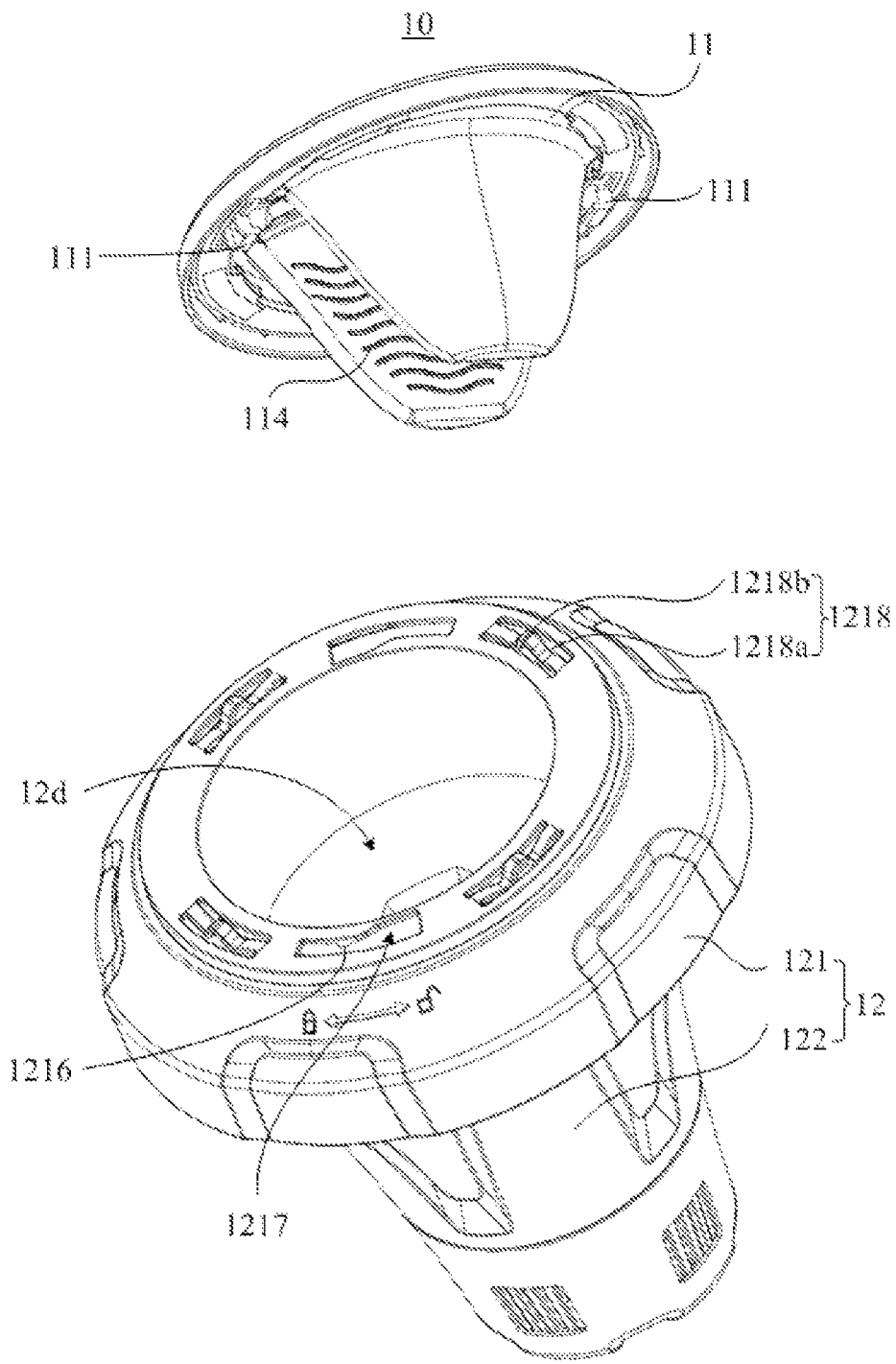
FIG. 4 schematically illustrates an exploded view of a cover 11 and a body portion 12 of the floating chemical dispenser 10 according to the embodiments of the present disclosure shown in FIG. 1.

Referring to FIG. 4, FIG. 4 schematically illustrates an exploded view of a cover 11 and a body portion 12 of the floating chemical dispenser 10 according to the embodiments of the present disclosure shown in FIG. 1.

In some embodiments, the first locking mechanism may include a first hook 111, an elastic structure 1218 and a first slot 1217, where the first hook 111 is disposed on a lower surface of the cover 11, and the elastic structure 1218 and the first slot 1217 are disposed on the first housing 121 of the body portion 12 near the opening 12d. Width of a first end of the first slot 1217 may be greater than width of a second end of the first slot 1217, the first hook 111 is configured to be inserted into the first slot 1217 from the first end of the first slot 1217, to slide to the second end of the first slot 1217 and to be hooked to an inner surface of the body portion 12, and the elastic structure 1218 is configured to apply an upward force to the cover 11. Specifically, the first locking mechanism is in the unlocking position when the first hook 111 is positioned at the first end of the first slot 1217, and the first locking mechanism is in the locking position when the first hook 111 is positioned at the second end of the first slot 1217.

In some embodiments, a stop part 1216 is disposed on the inner surface of the first housing 121 of the body portion 12, which is configured to stop the first hook 111 at the second end of the first slot 1217. Specifically, the stop part 1216 may be a first protrusion adjacent to the second end of the first slot 1217, and the first locking mechanism is in the locking position, when the first hook 111 is located between the second end of the first slot 1217 and the stop part 1216. In some embodiments, the first protrusion may be wedge-shaped.

In some embodiments, there may be two first hooks 111 symmetrically disposed on a lower surface of the cover 11.

In other embodiments, there may be two or more first hooks disposed on a lower surface of the cover, for example there may be three, four or five first hooks, accordingly there may be two or more first slots disposed on the first housing. The present disclosure is not limited thereto.

Figure 5:
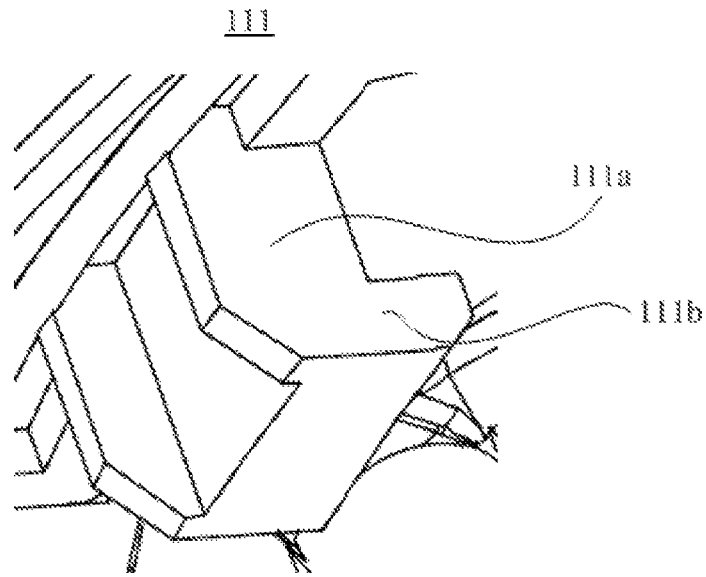
FIG. 5 schematically illustrates a partially enlarged view of a first hook 111 of the floating chemical dispenser 10 according to the embodiments of the present disclosure shown in FIG. 4.

Referring to FIG. 5, FIG. 5 schematically illustrates a partially enlarged view of the first hook 111 of the floating chemical dispenser 10 according to the embodiments of the present disclosure shown in FIG. 4. In some embodiments, the first hook 111 may be L-shaped, and may include a shank portion 111a and a hook portion 111b, where the hook portion 111b is configured to pass through the first end of the first slot 1217 and is configured to be hooked to an inner surface of the first housing 121 of the body portion 12, and the shank portion 111a is configured to slide in the first slot 1217. Specifically, the shank portion 111a may be in a vertical direction and the hook portion 111b connected with the shank portion 111a may be in a horizontal direction.

In some embodiments, the elastic structure 1218 may include a first slot 1218a and an elastic piece 1218b disposed in the first slot hole 1218a. The elastic piece 1218b may include a middle portion in an arcuate shape and two end portions located at both sides of the middle portion, where at least a portion of the middle portion protrudes from an outer surface of the first housing 121 of the body portion 12, and the two end portions are respectively connected with the first housing 121 at both ends of the first slot hole 1218a. When the cover 11 covers the opening 12d, the middle portion is configured to be elastically abutted against the cover 11, so as to apply an upward force to the cover 11.

In some embodiments, the elastic structure 1218 and the first housing 121 of the body portion 12 are integrally molded, and there may be a plurality of elastic structures 1218 symmetrically disposed on a surface of the first housing 121 of the body portion 12.

It should be noted that, the first hook 111 disposed on the cover 11 and the elastic structure 1218 and the first slot 1217 disposed on the first housing 121 of the body portion 12 are described as an example of the first locking mechanism 11 in the present embodiment. However, embodiments of the present disclosure are not limited thereto. For example, in other embodiments, the first hook may be disposed on the first housing of the body portion, the elastic structure and the first slot may be disposed on the cover, which can also achieve a detachable connection of the cover and the body portion.

It should be also noted that, in the present embodiment, a first slot hole 1218a and an elastic piece 1218b in the first slot hole 1218a are described as an example of the first locking mechanism. However, embodiments of the present disclosure are not limited thereto. For example, in other embodiments, the elastic structure in the first locking mechanism may also be a spring, or a spring pin or the like that can provide elastic force.

From above, it can be seen that, the cover 11 can be locked or unlocked only when the user presses and rotates the cover 11, that is, the floating chemical dispenser 10 in the present disclosure can reduce the risk that the cover 11 is opened by children and the children contact the solid chemicals in the storage chamber by accident through a double action (i.e. pressing and rotation) design in opening manner of the cover 11, thereby improving the safety performance of the floating chemical dispenser 10.

As described in the background art, when a user puts the solid chemicals into the chemical storage chamber of the floating chemical dispenser in the conventional technology, the user usually takes the solid chemicals directly by hand which is prone to hurting the users' skin. In order to solve this technical problem, in some embodiments of the present disclosure, the cover 11 of the floating chemical dispenser 10 may include an isolation glove which is made of a flexible material.

Figure 6A:
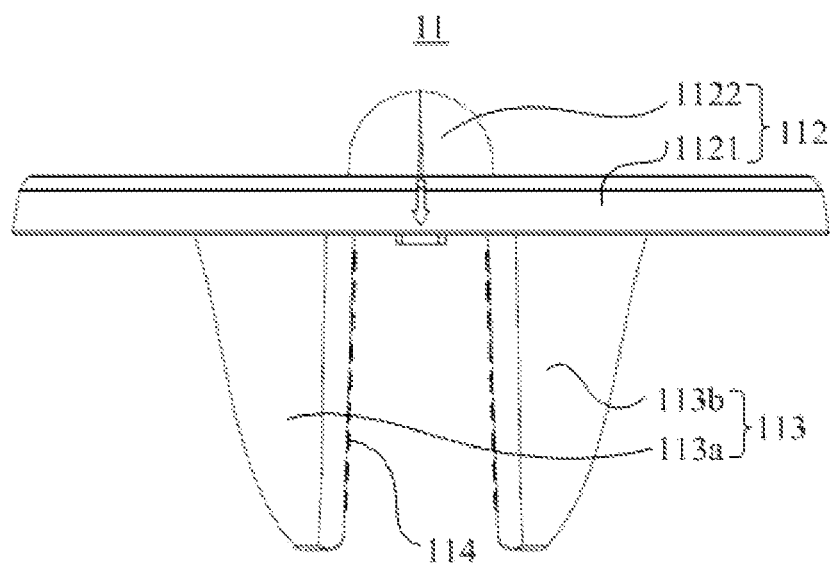
FIG. 6A schematically illustrates a front view of the cover 11 of the floating chemical dispenser 10 according to the embodiments of the present disclosure shown in FIG. 1.
Figure 6B:
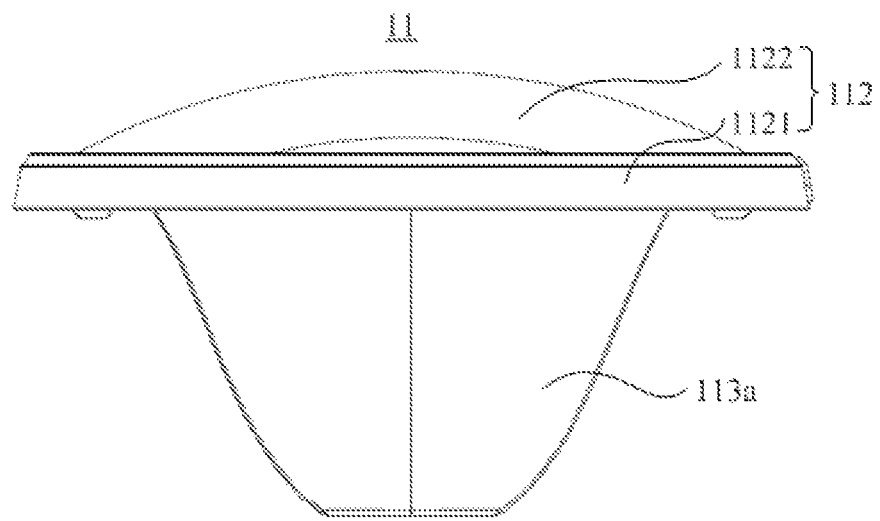
FIG. 6B schematically illustrates a left view of the cover 11 of the floating chemical dispenser 10 according to the embodiments of the present disclosure shown in FIG. 1.
Figure 6C:
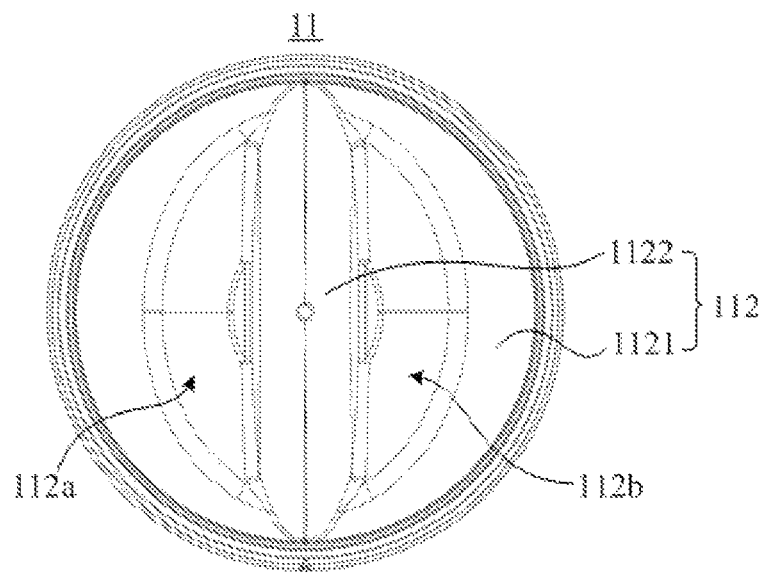
FIG. 6C schematically illustrates a top view of the cover 11 of the floating chemical dispenser 10 according to the embodiments of the present disclosure shown in FIG. 1.

Referring to FIGS. 6A to 6C, FIGS. 6A, 6B and 6C respectively illustrate a front view, a left view, and a top view of the cover 11 of the floating applicator 10 according to the embodiments of the present disclosure shown in FIG. 1.

In some embodiments, the cover 11 may include a frame portion 112 and a flexible isolation glove 113, where one end (i.e., an open end) of the flexible isolation glove 113 is connected with the frame portion 112. Referring to FIG. 4, when the opening 12d of the body portion 12 is closed by the cover 11, the other end of the flexible isolation glove 113 extends into the first chamber 12a of the body portion 12, so that the user can take the solid chemicals in the first chamber 12a by means of the flexible isolation glove 113, thereby preventing the user's skin from being hurt when the user is in direct contact with the solid chemicals.

Specifically, the frame portion 112 may be made of rigid plastic and at least a portion of the frame portion 112 may be wrapped with a flexible material, a material of the flexible isolation glove 113 may be Poly Vinyl Chloride (PVC), and both the frame portion 112 and the flexible isolation glove 113 may be formed by an injection molding process.

In some embodiments, the frame portion 112 may include an annular outer frame 1121 and a handle frame 1122 that crosses the annular outer frame 1121, where two ends of the handle frame 1122 are connected with the annular outer frame 1121 so as to define two openings, i.e. a first opening 112a and a second opening 112b. Accordingly, the isolation glove 113 may include a first sleeve portion 113a and a second sleeve portion 113b, the first sleeve portion 113a and the second sleeve portion 113b are respectively disposed at both sides of the handle frame 1122, an open end of the first sleeve portion 113a is connected with the outer frame 1121 and the handle frame 1122 near the first opening 112a, and an open end of the second sleeve portion 113b is connected with the outer frame 1121 and the handle frame 1122 near the second opening 112b.

In some embodiments, a first frictional structure 114 is disposed on two opposite inner sides of the first sleeve portion 113a and the second sleeve portion 113b. Specifically, the first friction structure 114 may be a plurality of wale as shown in FIG. 4.

In some embodiments, the cover 11 may be divided into a rigid frame portion and a flexible portion, depending on material composition and preparation process.

Figure 7A:
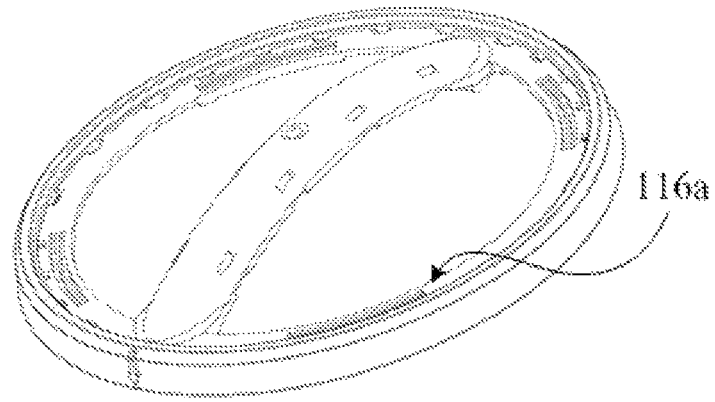
FIG. 7A schematically illustrates a stereogram of a rigid frame portion 116 of the cover 11 of the floating chemical dispenser 10 according to the embodiments of the present disclosure shown in FIG. 1.
Figure 7B:
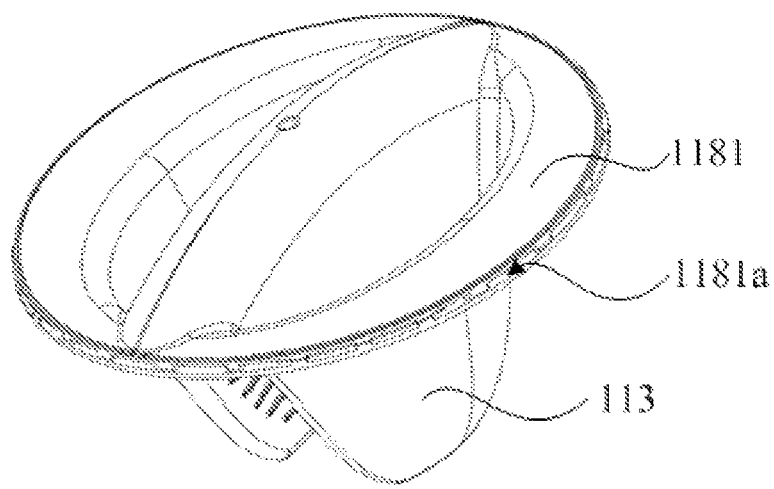
FIG. 7B schematically illustrates a stereogram of a flexible portion 118 of the cover 11 of the floating chemical dispenser 10 according to the embodiments of the present disclosure shown in FIG. 1.

Referring to FIGS. 7A and 7B, FIG. 7A schematically illustrates a stereogram of a rigid frame portion 116 of the cover 11 of the floating chemical dispenser 10 according to the embodiments of the present disclosure shown in FIG. 1, and FIG. 7B schematically illustrates a stereogram of a flexible portion 118 of the cover 11 of the floating chemical dispenser 10 according to the embodiments of the present disclosure shown in FIG. 1. The cover 11 includes a rigid frame portion 116 and a flexible portion 118, where the rigid frame portion 116 is made of a rigid plastic by an injection molding process, while the flexible portion 118 is made of flexible plastic (e.g., PVC, etc.), and the flexible portion 118 may partially wrap or completely wrap a surface of the rigid frame portion 116 by a secondary injection molding process.

In the present embodiment, at least a portion of the rigid frame portion 116 is wrapped with the flexible portion 118. Specifically, an upper surface of the rigid frame portion 116 is wrapped with a flexible material, while a lower surface of the rigid frame portion 116 is not wrapped with the flexible material or is partially wrapped with the flexible material, due to the first hook 111 being disposed on a lower surface of the rigid frame portion 116 and being rigidly connected with the first housing 121 (as shown in FIG. 4).

Referring to FIG. 7B, in some embodiments, the flexible portion 118 may include the flexible isolation glove 113 and a flexible cover layer 1181, and an outer edge 1181a of the flexible cover layer 1181 is connected with an inner edge 116a of the rigid frame portion 116 by the secondary injection molding process.

In order to strengthen a connection between the control portion and the body portion, and to prevent the control portion from being separated from the body portion when a user rotates the control portion, a second locking mechanism is disposed between the control portion and the second housing of the body portion according to some embodiments of the present disclosure.

Figure 8:
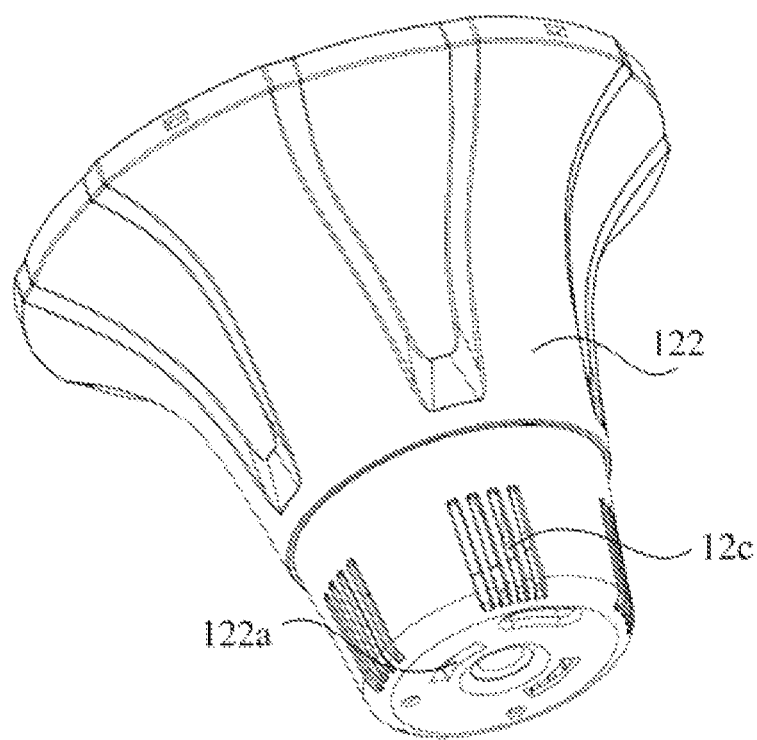
FIG. 8 schematically illustrates a first exploded view of a control portion 14 and a second housing 122 of the floating chemical dispenser 10 according to the embodiments of the present disclosure shown in FIG. 1.
Figure 8:
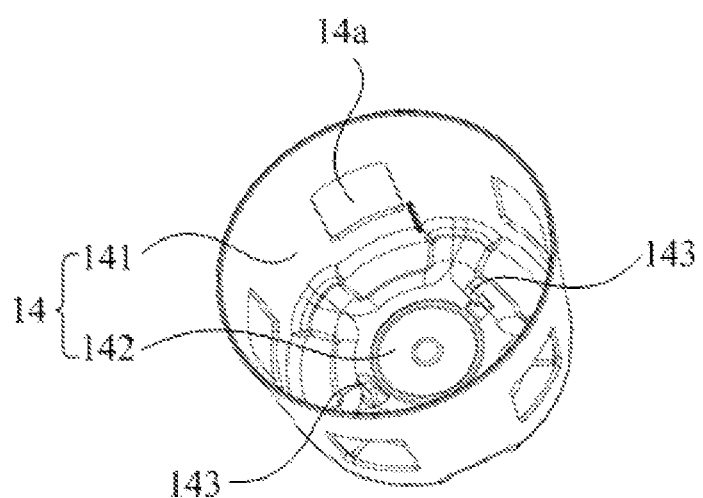

Referring to FIG. 8, FIG. 8 schematically illustrates a first exploded view of the control portion 14 and the second housing 122 of the body portion 12 of the floating chemical dispenser 10 according to the embodiments of the present disclosure shown in FIG. 1.

In some embodiments, the control portion 14 may be cup-shaped and may include a side wall 141 and a bottom portion 142, and the control portion 14 is rotatably connected with the second housing 122 via a second locking mechanism. The second locking mechanism may include a second slot 122a disposed at a bottom of the second housing 122, and a second hook 143 disposed on an inner surface of the bottom portion 142 of the control portion 14. When the control portion 14 is connected with the second housing 122, the second hook 143 is configured to pass through the second slot 122a, to slide in the second slot 122a and to be hooked to an inner surface of the bottom of the second housing 122.

Specifically, the second hook 143 may be L-shaped and includes a shank portion and a hook portion, where the hook portion is configured to pass through the second slot 122a and is configured to be hooked to the inner surface of the bottom of the second housing 122, and the shank portion is configured to slide in the second slot 122a. The shank portion may be in a vertical direction and the hook portion may be in a horizontal direction.

In the present embodiment, there may be two second hooks 143 symmetrically disposed on the inner surface of the bottom portion 142 of the control portion 14. Accordingly, two second slots 122a are disposed at positions at bottom of the second housing 122 that correspond to the two second hooks 143. In other embodiments, there may be two or more second hooks 143 and two or more second slots 122a, for example there may be three, four or five second hooks 143 and three, four or five second slots 122a. In other embodiments, the second hook may be disposed at a bottom of the second housing, and the second slot may be disposed on an inner surface of the bottom portion of the control portion 14. The present disclosure imposes no limitation on this.

In the present embodiment, there may be five groups of the first holes 12c uniformly disposed in a side wall of the second housing 122 near the bottom of the second housing 122, and each group may include four first holes 12c, each first hole 12c is strip-shaped and parallelly arranged.

Accordingly, there are five second holes 14a disposed at positions on the side wall 141 of the control portion 14 corresponding to the five groups of the first holes 12c, that is, each of the five second holes 14a corresponds to a group of first holes 12c respectively. In some embodiments, an area of each second hole 14a may be greater than or equal to an area of each group of first holes 12c, so that the first holes 12c can be fully communicated with an external environment when the first holes 12c are fully overlapped with the second holes 14a, then amount of liquid flowing through the first holes 12c per unit time reaches a maximum value; when each second hole 14a is located between two adjacent groups of first holes 12c, the first holes 12c are in a closed state and no liquid can flow through the first holes 12c; when each group of first holes 12c are partially overlapped with each second hole 14a, only a part of the first holes 12c is communicated with the external environment, then the amount of the liquid flowing through the first holes 12c per unit time lies between zero and the maximum value. Therefore, users can control a speed at which the liquid flows into or flows out of the first chamber 12a via the first holes 12c by rotating the control portion 14.

Specifically, when the shank portion of the second hook 143 is located at a first end of the second slot 122a, each second hole 14a is completely overlapped with one group of first holes 12c; when the shank portion of the second hook 143 is located at a second end of the second slot 122a, each second hole 14a is located between adjacent groups of first holes 12c; when the shank portion of the second hook 143 is located between the first end and the second end of the second slot 122a, each second hole 14a is partially overlapped with one group of first holes 12c. A distance of the shank portion sliding in the second slot 122a may be greater than or equal to size of each group of first holes 12c along the sliding direction.

In other embodiments, the at least one first hole and the at least one second hole may also have other shapes or be disposed in other ways, such as the at least one first hole and the at least one second hole may have a same number, a same shape and a same size, each second hole may correspond to one first hole, when each first hole is overlapped with one second hole, liquid can flow through each first hole; when each second hole is positioned between two adjacent first holes, liquid cannot flow through the first hole. The present disclosure imposes no limitation on this.

The second locking mechanism of the floating chemical dispenser 10 according to embodiments of the present disclosure connects the control portion with the body portion, so that the control portion can be prevented from being separated from the body portion.

Figure 9:
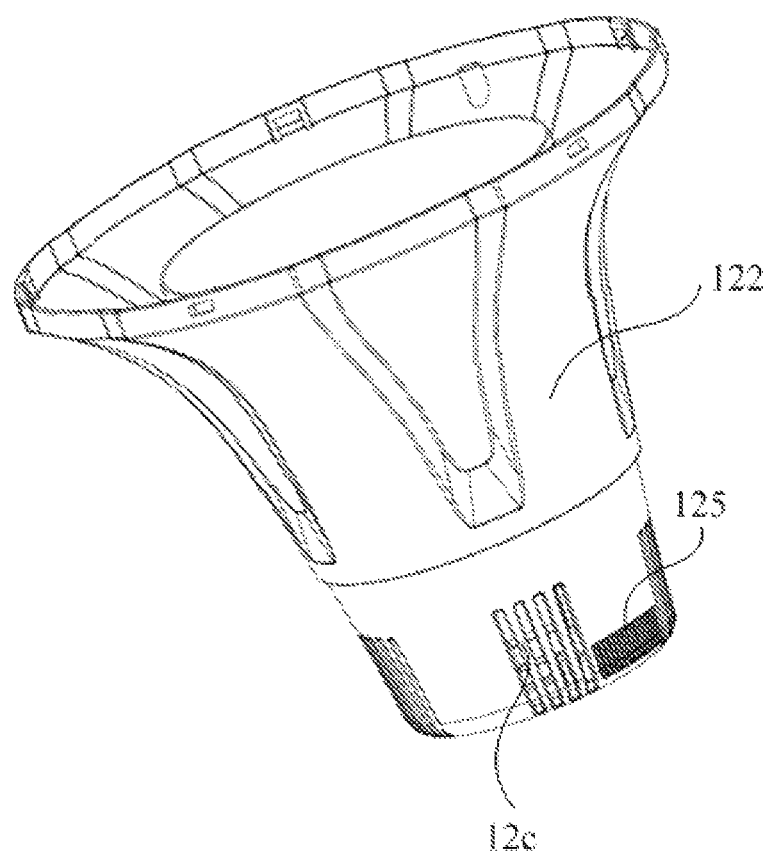
FIG. 9 schematically illustrates a second exploded view of the control portion 14 and the second housing 122 of the floating chemical dispenser 10 according to the embodiments of the present disclosure shown in FIG. 1.
Figure 9:
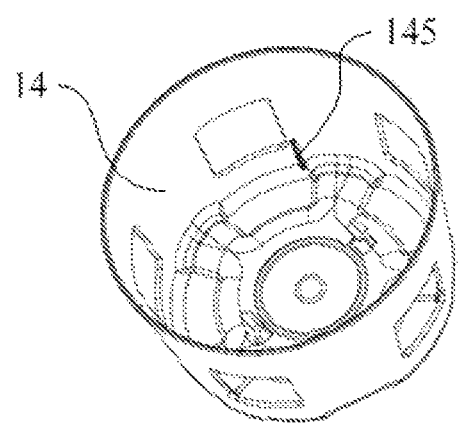

Referring to FIG. 9, FIG. 9 schematically illustrates a second exploded view of the control portion 14 and the second housing 122 of the floating chemical dispenser 10 according to the embodiments of the present disclosure shown in FIG. 1. In some embodiments, a second friction structure is disposed on the second housing 122 of the body portion 12 and the control portion 14 respectively, so as to increase friction between the control portion 14 and the body portion 12. The second friction structure may include a tooth surface 125 on the second housing 122 of the body portion 12 and at lease one first ribs 145 on the control portion 14; where the tooth surface 125 may be located between two adjacent groups of first holes 12c, and may include a plurality of longitudinal grooves, and the plurality of longitudinal grooves may be arranged parallelly to each other. In some embodiments, there may be a plurality of first ribs 145 (only one first rib 145 is shown in FIG. 9) on the control portion 14, when a user rotates the control portion 14, the user needs to overcome friction between the plurality of first ribs 145 and the plurality of longitudinal grooves, thus the friction is increased The second friction structure in the present embodiment can increase the friction between the control portion 14 and the body portion 12, thereby preventing the control portion 14 from rotating under impact of water flow.

The body portion 12 as a main assembly of the floating chemical dispenser 10, is not only applied to provide chambers for receiving solid chemicals and the floating member 13, but also needs to exchange liquid with the external environment, so that the solid chemicals in the first chamber 12a can be dissolved and diffuse into the surrounding environment. One example of the body portion 12 will be described below in detail to illustrate the function of the body portion 12. However, it will be understood by those skilled in the art that structure of the body portion 12 in the present disclosure is not limited thereto.

Figure 10:
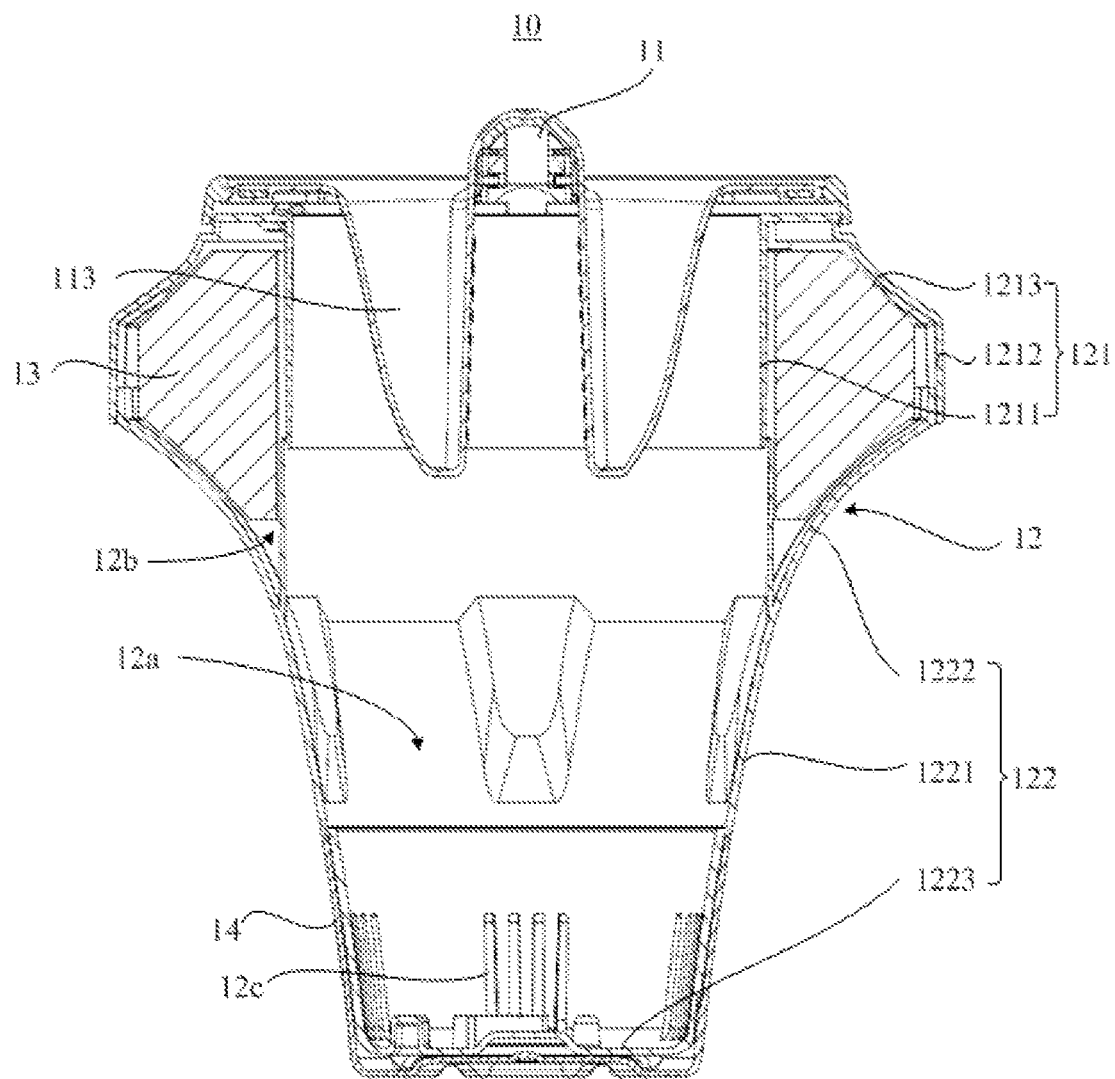
FIG. 10 schematically illustrates a cross-sectional view of the floating chemical dispenser 10 along a line AA1 according to the embodiments of the present disclosure shown in FIG. 2B.

Referring to FIG. 10, FIG. 10 schematically illustrates a cross-sectional view of the floating chemical dispenser 10 along a line AA1 according to the embodiments of the present disclosure shown in FIG. 2B.

As described above, the floating chemical dispenser 10 includes a cover 11, a body portion 12 and a control portion 14, where the body portion 12 may include a first chamber 12a for receiving solid chemicals and a second chamber 12b for receiving the floating member 13. It should be noted that, the second chamber 12b is only partially visible due to being occupied by the floating member 13.

In conjunction with FIG. 3B, in some embodiments, the first housing 121 is annular shaped, and the first housing 121 may include an annular first side wall 1211, an annular second side wall 1212, and a top surface 1213 connecting one edge of the first side wall 1211 and one edge of the second side wall 1212, where the second side wall 1212 may surround an outer side of the first side wall 1211; the second housing 122 may include an annular third side wall 1221 and an annular forth side wall 1222, and a bottom wall 1223 that is connected with one edge of the third side wall 1221, where the third side wall 1221 and the bottom wall 1223 collectively define the first chamber 12a, the fourth side wall 1222 surrounds an outer side of the third side wall 1221 and one edge of the fourth side wall 1222 is connected with an outer surface of the third side wall 1221, where an opening diameter at one edge of the fourth side wall 1222 is smaller than an opening diameter at the other edge of the fourth side wall 1222; the other edge of the first side wall 1211 of the first housing 121 and the other edge of the second side wall 1212 of the first housing 121 are respectively connected with the other edge of the third side wall 1221 of the second housing 122 and the other edge of the fourth side wall 1222 of the second housing 122, so that the top surface 1213, the first side wall 1211 and the second side wall 1212 of the first housing 121, and a portion of the third side wall 1221 and the fourth side wall 1222 of the second housing 122 collectively form a closed chamber, i.e. the second chamber 12b.

When the cover 11 is connected with the body portion 12, an annular space surrounded by the first side wall 1211 of the first housing 121 is communicated with an annular space surrounded by the third side wall 1221 of the second housing 122, the flexible isolation glove 113 of the cover 11 passes through the annular space surrounded by the first side wall 1211 and extends to the first chamber 12a, so that the user can take the solid chemicals in the first chamber 12a by means of the flexible isolation glove 113.

Referring to FIG. 3B, in some embodiments, there may be a plurality of second ribs 1214 disposed on an inner surface of the second side wall 1212 of the first housing 121, and a plurality of grooves 13a that cooperate with the plurality of second ribs 1214 may be disposed on the floating member 13. When the first housing 121 is connected with the second housing 122, the plurality of second ribs 1214 are inserted into the plurality of grooves 13a so as to fix the floating member 13.

As described above, one end of the first housing 121 is detachably connected with the cover 11 via the first locking mechanism. In some embodiments, the other end of the first housing 121 is detachably connected with the second housing 122 via the third locking mechanism. Specifically, referring to FIG. 3B, the third locking mechanism may include: a second slot hole 1222a disposed at the other edge of the fourth side wall 1222 of the second housing 122 and a second protrusion 1215 disposed on an inner surface of the second side wall 1212 of the first housing 121. The second protrusion 1215 is configured to be stuck in the second slot hole 1222a to connect the first housing 121 and the second housing 122. Specifically, the second protrusion 1215 may be wedge-shaped.

In conclusion, the cover of the floating chemical dispenser is detachably connected with the body portion via the first locking mechanism, where the first locking mechanism has the locking position and the unlocking position, and is configured to move between the locking position and the unlocking position via pressing and rotating the cover by a user, so as to control locking or unlocking of the cover and the body portion. In the present disclosure, the risk that the cover is opened by children and the children contact the solid chemicals in the storage chamber by accident can be reduced through a double action (i.e. pressing and rotating) design in opening manner of the cover, thereby improving the safety performance of the floating chemical dispenser.

Further, a flexible isolation glove is disposed on the cover, so that the user can take the solid chemicals by means of the flexible isolation glove, thereby preventing the user's skin from being hurt when the user is in direct contact with the solid chemicals.

Further, the floating chemical dispenser further includes a control portion, which is sleeved outside the other end of the body portion where the at least one first hole is located and is rotatably connected with the body portion, and the user can control amount of liquid flowing into or flowing out of the first chamber via the at least one first hole by rotating the control portion, so as to control dissolution rate of the solid chemicals in the first chamber or rate of the chemical solution diffusing into the pool.

Further, the control portion and the body portion can be connected with each other through the second locking mechanism, thereby preventing the control portion from being separated from the body portion during operation.

Further, the friction structure can increase friction between the control portion and the body portion, thereby preventing the control portion from rotating under impact of water flow.

Although the utility model is disclosed as above, the utility model is not limited thereto. Any person skilled in the art will be able to make various modifications and modifications without departing from the spirit and scope of the utility model, and the scope of protection of the utility model should be determined by the scope of the claims.

What is claimed is:

1. A floating chemical dispenser, comprising:
   a body portion having a first chamber for receiving solid chemicals, a second chamber for receiving a floating member, and at least one first hole for communicating the first chamber with an external environment, an opening is disposed at one end of the body portion, and the opening is communicated with the first chamber; and
   a cover, configured to close the opening of the body portion;
   wherein the cover is detachably connected with the body portion via a first locking mechanism, and the first locking mechanism has a locking position and an unlocking position, and is configured to move between the locking position and the unlocking position via pressing and rotating the cover by a user, so as to control locking or unlocking of the cover and the body portion;
   wherein the first locking mechanism comprises: a first hook, an elastic structure and a first slot; and
   wherein the first hook is disposed on the cover, the elastic structure and the first slot are disposed on a housing of the body portion near the opening, width of a first end of the first slot is greater than width of a second end of the first slot, the first hook is configured to be inserted into the first slot from the first end of the first slot, to slide to the second end of the first slot and to be hooked to an inner surface of the body portion, the elastic structure is configured to apply an upward force to the cover, the first locking mechanism is in the unlocking position when the first hook is positioned at the first end of the first slot, and the first locking mechanism is in the locking position when the first hook is positioned at the second end of the first slot.

2. The floating chemical dispenser according to claim 1, wherein a stop part is disposed on the body portion, and configured to stop the first hook at the second end of the first slot.

3. The floating chemical dispenser according to claim 2, wherein the stop part comprises a protrusion, the protrusion is adjacent to the second end of the first slot, and when the first hook is positioned between the second end of the first slot and the stop part, the first locking mechanism is in the locking position.

4. The floating chemical dispenser according to claim 1, wherein the first hook is L-shaped, and comprises a shank portion and a hook portion, the hook portion is configured to pass through the first end of the first slot and to be hooked to the inner surface of the body portion, and the shank portion is configured to slide in the first slot.

5. The floating chemical dispenser according to claim 1, wherein the elastic structure comprises:
   a slot hole disposed on the housing of the body portion near the opening; and
   an elastic piece disposed in the slot hole, the elastic piece comprises a middle portion in an arcuate shape and two end portions located at both sides of the middle portion, where the two end portions are respectively connected with the housing of the body portion at both ends of the slot hole, at least a portion of the middle portion protrudes from surface of the housing of the body portion, and the middle portion is configured to be elastically abutted against the cover.

6. The floating chemical dispenser according to claim 5, wherein the elastic structure and the housing of the body portion are integrally molded.

7. A floating chemical dispenser, comprising:
   a body portion having a first chamber for receiving solid chemicals, a second chamber for receiving a floating member, and at least one first hole for communicating the first chamber with an external environment, an opening is disposed at one end of the body portion, and the opening is communicated with the first chamber; and
   a cover, configured to close the opening of the body portion;
   wherein the cover is detachably connected with the body portion via a first locking mechanism, and the first locking mechanism has a locking position and an unlocking position, and is configured to move between the locking position and the unlocking position via pressing and rotating the cover by a user, so as to control locking or unlocking of the cover and the body portion;
   wherein the cover comprises a rigid frame portion and a flexible isolation glove connected with the rigid frame portion, and the isolation glove is configured to be used by a user to take the solid chemicals.

8. A floating chemical dispenser, comprising
   a body portion having a first chamber for receiving solid chemicals, a second chamber for receiving a floating member, and at least one first hole for communicating the first chamber with an external environment, an opening is disposed at one end of the body portion, and the opening is communicated with the first chamber; and
   a cover, configured to close the opening of the body portion; and
   a control portion, sleeved outside the other end of the body portion where the at least one first hole is located and configured to control amount of liquid flowing into or flowing out of the first chamber via the at least one first hole;
   wherein the cover is detachably connected with the body portion via a first locking mechanism, and the first locking mechanism has a locking position and an unlocking position, and is configured to move between the locking position and the unlocking position via pressing and rotating the cover by a user, so as to control locking or unlocking of the cover and the body portion;
   wherein the control portion is rotatably connected with the body portion via a second locking mechanism, and the second locking mechanism comprises:
      a second slot, disposed at a bottom of the body portion, and
      a second hook, disposed on the control portion;
      wherein the second hook is configured to pass through the second slot, to slide in the second slot and to be hooked to an inner surface of the bottom of the body portion, when the control portion is connected with the body portion.

9. The floating chemical dispenser according to claim 8, wherein a friction structure is respectively disposed on the body portion and the control portion, and is configured to increase friction between the control portion and the body portion when there is a relative rotation between the control portion and the body portion.

10. The floating chemical dispenser according to claim 9, wherein the friction structure comprises a tooth surface on the body portion and at least one rib on the control portion; and the tooth surface comprises a plurality of longitudinal grooves, and the plurality of longitudinal grooves are arranged in parallel.

* * * * *